F. C. HARRIS.
SPEED INDICATOR.
APPLICATION FILED FEB. 2, 1920.

1,404,850.

Patented Jan. 31, 1922.

INVENTOR.
FRANK C. HARRIS.
BY Albert C. Bell
ATTORNEY.

UNITED STATES PATENT OFFICE.

FRANK C. HARRIS, OF FAIRFIELD, IOWA.

SPEED INDICATOR.

1,404,850. Specification of Letters Patent. Patented Jan. 31, 1922.

Application filed February 2, 1920. Serial No. 355,654.

*To all whom it may concern:*

Be it known that I, FRANK C. HARRIS, a citizen of the United States, residing at Fairfield, in the county of Jefferson and State of Iowa, have invented a new and useful Improvement in Speed Indicators, of which the following is a specification.

My invention relates to an improved speed indicator for indicating the speed of moving vehicles by devices actuated by a moving part of the vehicle, or more broadly for indicating the speed of operation or rotation of moving parts. My invention particularly relates to devices for providing an indication of the kind referred to by which a moving pointer or equivalent device is actuated electrically from suitable devices for controlling the current flow, which devices are actuated by the moving parts. In carrying out my invention I provide switching mechanism operated by the moving part, which switching mechanism produces an alternating current flow in a circuit including an electromagnetic device disposed to actuate the indicating mechanism. By my invention I employ positively actuated circuit changing springs or the equivalent which positively make and break electrical contact in a manner to produce alternating impulses of current flow through the circuit controlling the operation of the indicating pointer or other device, as distinguished from rotating commutators which have been proposed heretofore for this purpose and which have been found inefficient for the reason that contact is not maintained accurately with said commutators owing to the jumping of the brushes.

My invention will best be understood by reference to the accompanying drawings showing a preferred embodiment thereof, in which—

Similar numerals refer to similar parts throughout the several views.

Figure 1:
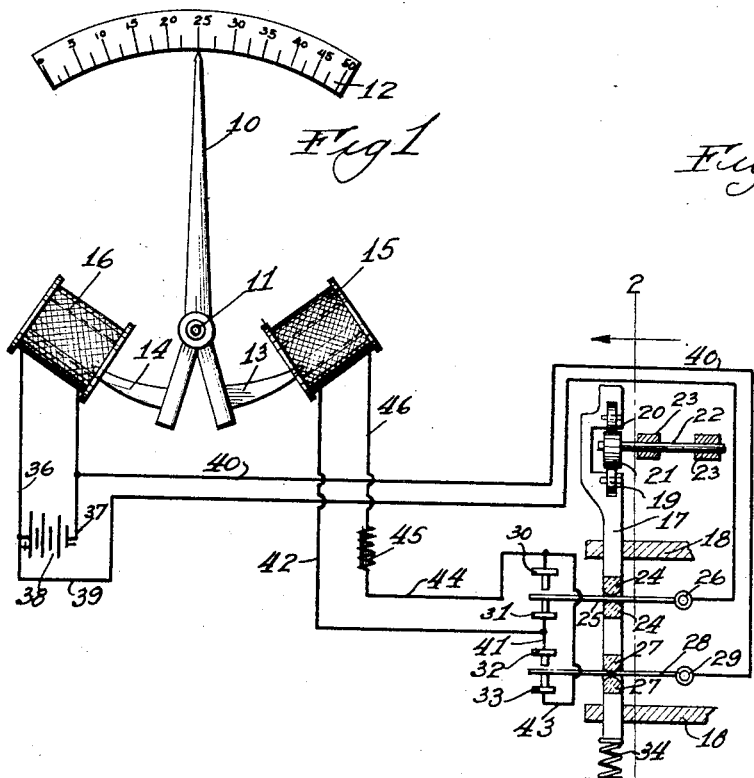
Fig. 1 is a diagrammatic view of my improved indicating mechanism and the devices employed to actuate the same together with the circuit connections used to connect the indicating mechanism with the actuating devices.
Figure 2:
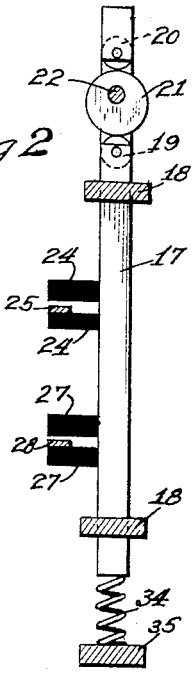
Fig. 2 is a side elevation of the actuating devices shown in Fig. 1.

As shown in Fig. 1 the indicating mechanism consists of a pointer 10 pivotally supported at 11 and a scale 12 disposed adjacent the indicating end of the pointer for indicating the speed of operation of the device whose speed is to be measured. The lower end of the pointer 10 is continued beyond its pivot 11 and carries two curved cores 13 and 14 for the solenoids 15 and 16 respectively.

The actuating mechanism employed for operating the indicating devices consists of a reciprocating member 17 mounted in suitable bearings 18, which carries at its upper end as shown in Fig. 1 two rollers 19 and 20 engaging opposite sides of a cam 21 of circular conformation which is eccentrically mounted on a shaft 22 rotatably mounted in bearings 23, which shaft is connected in any desired manner with the moving parts the speed of which it is desired to measure. The bar 17 has projecting therefrom two insulating studs 24 engaging opposite sides of a spring contact 25 supported at 26 and also two insulating studs 27 similarly engaging a second spring contact 28 supported at 29. Contacts 30 and 31 are associated with the spring contact 25 and similar contacts 32 and 33 are associated with the spring contact 28 in such a manner that when the bar 17 is moved upwardly by rotation of the cam 21, said spring contacts 25 and 28 engage respectively the contacts 30 and 32 and when said bar is moved downwardly by the action of said cam said spring contacts engage respectively the contacts 31 and 33. A spring 34 is disposed between the lower end of the bar 17 and a fixed abutment 35 to compensate for the weight of the bar and relieve the strain on the cam 21 as it rotates. Where the rate of rotation of the shaft 22 is not great, the roller 20 may be omitted and the spring 34 alone relied upon to maintain the roller 19 in engagement with the surface of the cam 21.

The terminals of the solenoids 16 are connected by wires 36 and 37 with the respective terminals of the battery 38, and the wire 36 is connected by wire 39 with the contact spring 25 at its support 26 while the wire 37 is connected by wire 40 with the contact spring 28 at its support 29. The contacts 31 and 32 are connected together by wire 41 and this wire is connected by wire 42 with one terminal of the solenoid 15. The contacts 30 and 33 are connected together by wire 43 which wire is connected by wire 44 with one terminal of the impedance coil 45, the other terminal of which is connected by wire 46 with the other terminal of the solenoid 15.

Assuming that the wires 36 and 37 are connected respectively with the positive and negative terminals of the battery 38 as indicated, it will be observed that when the contact springs 25 and 28 are in their lower position as indicated in Fig. 1, current flows from the battery 38 through the solenoid 15 through the following path: battery 38, wire 36, wire 39, contact spring 25, contact 31, wire 41, wire 42, solenoid 15, wire 46, impedance coil 45, wire 44, wire 43, contact 33, contact spring 28, wire 40, wire 37, back to battery 38. When the contact springs 25 and 28 are moved upward away from the contacts 31 and 33, the circuit just traced is interrupted and a second circuit is closed as follows from battery 38: battery 38, wire 36, wire 39, contact spring 25, contact 30, wire 44, impedance coil 45, wire 46, solenoid 15, wire 42, wire 41, contact 32, contact spring 28, wire 40, wire 37, back to battery 38. From the circuit just traced it will appear that for each cycle of operation of the bar 17 two impulses are sent through the winding of the solenoid 15 said impulses being opposite in direction and producing in effect an alternating current flow through the winding of the solenoid. The impedance coil 45 is so proportioned and the rate of operation of the bar 17 is preferably high enough for the slowest rate to be indicated by the pointer 10 that the impedance coil exerts a retarding effect upon the alternating current passing through it proportional to the speed of the device to be measured, as a result of which as the rate of the alternations or the frequency of the alternating current is increased the amount of current flowing through the solenoid 15 will be decreased, since it is to be borne in mind that a constant electromotive force is impressed upon the circuit of the solenoid 15 by the battery 38. It will also be observed that the solenoid 16 is energized by direct current flow of constant electromotive force as a result of which a constant magnetomotive force is impressed by said solenoid upon the core 14. In this manner a differential action is produced upon the cores 13 and 14 which serves to move the pointer from one position to another between its positions of extreme movement depending upon the amount of current flow through the solenoid 15, which current is inversely proportional to the speed of operation of the shaft 22. In this manner an accurate means is provided for indicating the speed of rotation of said shaft. The solenoids 15 and 16 are so proportioned that when the current flowing through the solenoid 15 is of the value determined by the lowest speed of operation of the shaft 22 to be measured, the result of the magnetic action upon the cores 13 and 14 is such as to move the pointer 10 to nearly its zero indication on the scale 12. The scale 12 is then calibrated so as to correctly indicate other speeds of the shaft 22 for other amounts of the differential action of the solenoids 15 and 16 referred to.

Figure 3:
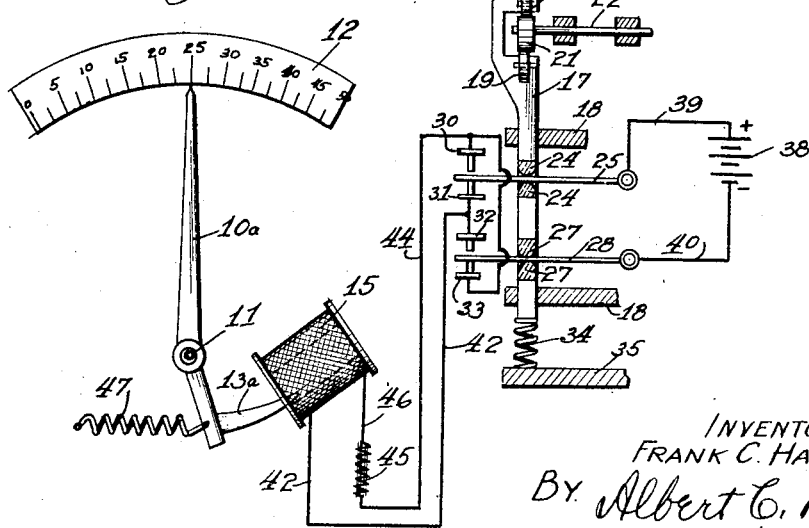
Fig. 3 shows in a view similar to Fig. 1 a modified form of indicating mechanism operated by my improved actuating devices.

In the construction shown in Fig. 3, substantially the same actuating devices are employed, the only difference being that the battery 38 has its terminals directly connected by wires 39 and 40 with the contact springs 25 and 28, all other circuit connections from the battery being removed, since the solenoid 16 is omitted in this construction and replaced by a spring 47 acting upon the pointer 10ª to exert a similar varying pull thereon in opposition to the magnetic pull exerted by the solenoid 15. In this construction the solenoid 15 is connected to the contacts associated with the contact springs 25 and 28 in the same manner as described above and the device is operated in substantially the same manner to indicate the speed of rotation of the shaft 22 or other moving parts used to reciprocate the bar 17.

From the above it will appear that I have provided an improved actuating means for speed indicators by which an alternating current may be accurately and definitely produced, varying in rate or frequency with variations in the speed of the device to be measured. And furthermore by my improved construction I provide a means by which the alternating current thus produced may be made the means for varying the current delivered to indicating devices so that the amount of current flow varies inversely as the rate of speed of the device which is to be measured.

While I have shown my invention in the particular embodiment above described I do not however limit myself to this exact construction in carrying out my invention as I may employ equivalents thereof known to the art at the time of the filing of this application without departing from the scope of the appended claims.

What I claim is:

1. In a speed indicator the combination of a reciprocable member, two contact springs insulated from and operated by said member, a contact for engagement by each contact spring by its movement in each direction, a source of direct current connected with said springs, a solenoid having one terminal of its winding connected with the outer contacts of said springs and having its other terminal connected with the inner contacts of said springs, an impedance coil connected in circuit with said solenoid between said solenoid and said contacts, and an indicator operated by said solenoid, said member adapted to be actuated by mechanism the speed of which is to be indicated, whereby the displacement of said indicator from its zero position is proportional to the rate of operation of said member.

2. In a speed indicator, the combination of a source of direct current, pole changing devices comprising contact springs and contacts connected with said source, and an indicator and impedance coil connected in circuit with said pole changing devices, said pole changing devices adapted for operation by mechanism the speed of which is to be indicated.

3. In a speed indicator, the combination of two current reversing contact springs, two contacts for alternate engagement with each contact spring, mechanism for simultaneously producing contact between said springs and said contacts alternately, a source of direct current and an indicator connected with said contacts and springs, said indicator being responsive proportionally to the frequency of the alternating current supplied to it, and devices the speed of which is to be indicated for operating said mechanism.

4. In a speed indicator, the combination of two current reversing contact springs, two contacts for alternate engagement with each contact spring, mechanism for simultaneously producing contact between said springs and said contacts alternately, a source of direct current and an indicator connected with said contacts and springs, said indicator being responsive proportionally to the frequency of the alternating current supplied to it, and devices the speed of which is to be indicated for operating said mechanism, said mechanism comprising a reciprocating bar and insulating connections between said bar and said contact springs.

5. In a speed indicator, the combination of two current reversing contact springs, two contacts for alternate engagement with each contact spring, mechanism for simultaneously producing contact between said springs and said contacts alternately, a source of direct current and an indicator connected with said contacts and springs, said indicator being responsive proportionally to the frequency of the alternating current supplied to it, and devices the speed of which is to be indicated for operating said mechanism, said mechanism comprising a reciprocating bar, insulating connections between said bar and said contact springs, a cam for moving said bar in one direction and a spring for moving said bar in the reverse direction, said cam being actuated by said devices.

6. In a speed indicator, the combination of two current reversing contact springs, two contacts for alternate engagement with each contact spring, mechanism for simultaneously producing contact between said springs and said contacts alternately, a source of direct current and an indicator connected with said contacts and springs, said indicator being responsive proportionally to the frequency of the alternating current supplied to it, and devices the speed of which is to be indicated for operating said mechanism, said mechanism comprising a reciprocating bar, insulating connections between said bar and said contact springs, and a cam for positively moving said bar alternately in opposite directions, said cam being actuated by said devices.

7. In a speed indicator, the combination of two current reversing contact springs, two contacts for alternate engagement with each contact spring, mechanism for simultaneously producing contact between said springs and said contacts alternately, a source of direct current and an indicator connected with said contacts and springs, said indicator being responsive proportionally to the frequency of the alternating current supplied to it, and devices the speed of which is to be indicated for operating said mechanism, said mechanism comprising a reciprocating bar, insulating connections between said bar and said contact springs, a cam for moving said bar in one direction a spring for moving said bar in the reverse direction, said cam being actuated by said devices, and a roller carried by said bar engaging said cam.

8. In a speed indicator, the combination of two current reversing contact springs, two contacts for alternate engagement with each contact spring, mechanism for simultaneously producing contact between said springs and said contacts alternately, a source of direct current and an indicator connected with said contacts and springs, said indicator being responsive proportionally to the frequency of the alternating current supplied to it, and devices the speed of which is to be indicated for operating said mechanism, said mechanism comprising a reciprocating bar, insulating connections between said bar and said contact springs, a cam for positively moving said bar alternately in opposite directions, said cam being actuated by said devices, and rollers carried by said bar on opposite sides of and engaging said cam.

9. In a speed indicator, the combination of indicating devices, a movable magnetic member connected with said devices, an electromagnetic winding for exerting an attraction upon said member inversely proportional to the frequency of alternating current flowing through said winding, means tending to move said member from said winding, a circuit extending from said winding including an impedance coil in series therein, whereby supplying said circuit with an alternating current of a frequency proportional to the speed of the device to be indicated results in movement of said member from said winding and corresponding movement of said indicating devices as the frequency of said alternating current increases.

10. In a speed indicator, the combination of indicating devices, a movable magnetic member connected with said devices, an electromagnetic winding for exerting an attraction upon said member inversely proportional to the frequency of alternating current flowing through said winding, means tending to move said member from said winding, a circuit extending from said winding including an impedance coil in series therein, whereby supplying said circuit with an alternating current of a frequency proportional to the speed of the device to be indicated results in movement of said member from said winding and corresponding movement of said indicating devices as the frequency of said alternating current increases, said means consisting of a uniformly and constantly energized electromagnetic winding.

In witness whereof I hereunto subscribe my name this 30th day of January A. D. 1920.

FRANK C. HARRIS.